July 19, 1960  E. C. McRAE  2,945,482

VARIABLE SPEED DRIVES

Filed March 23, 1956

E.C. McRAE
INVENTOR.

BY J. R. Faulkner
T. H. Oster
R. T. Seeger

ATTORNEYS

United States Patent Office 2,945,482
Patented July 19, 1960

2,945,482
VARIABLE SPEED DRIVES

Edwin C. McRae, Dearborn, Mich., assignor to Ford Motor Company, Dearborn, Mich., a corporation of Delaware Filed Mar. 23, 1956, Ser. No. 573,517

15 Claims. (Cl. 123—41.11)

This invention is concerned with an apparatus for driving internal combustion engine accessories from such an internal combustion engine and for accomplishing this drive at at least two speed ratios between the engine and the accessories being driven.

It is customary to drive at least the fan and generator by connection with internal combustion engines and in many instances other accessories such as hydraulic pumps and air conditioning compressors are so propelled. It is usually undesirable to maintain a fixed ratio between engine speed and the speed of the engine driven accessories. Any such fixed ratio invariably results in the accessories operating at too low a speed during idling and slow speed driving or being overdriven at high speeds with enormously increased power wastage and accelerated wear of the accessories.

This invention is probably best understood by reference to the figures of drawing in which.

Figure 1:
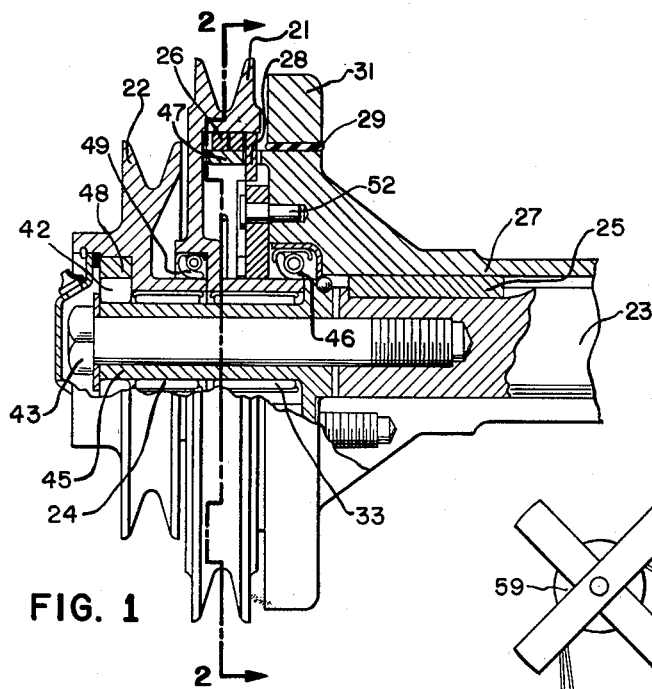
Figure 1 is a side elevational cutaway view of an embodiment of this invention.

Looking at Figure 1 is seen an engine crankshaft 23 keyed to a driving hub 27 by means of a key 25. A clutch supporting ring 47 is formed integrally with the hub 27 and serves to center a coil spring clutch 26 when it is in its inoperative position. Lubrication seal 46 is fitted in the central portion of hub 27. A vibration damping ring 31 is bonded to the periphery of hub 27 by means of a rubber spacer ring 29. The coil spring clutch 26 has one end fastened to the ring 47 by means of rivets 55 which may be seen in Figure 2. The clutch 26 is wound about the ring 47 approximately 2½ times with its free end extending inwardly through a slot in the ring 47. Shaft extension 45 is bolted to the crankshaft 23 by means of bolt 43 and rotates with shaft 23. A bearing assembly 24 rotatably mounts a pulley 22 on the extension 45. A roller clutch 42 engages shaft 45 and is fastened in pulley 22 by means of an outer member 48 so that extension 45 will drive the pulley 22 in one direction but will permit it to overrun. A second and larger pulley 21 is rotatably mounted on extension 45 by means of bearing assembly 33. The coil spring clutch 26 engages a drum in the pulley 21. Another lubrication seal 49 is positioned between the shaft extension 45 and the second and larger pulley 21.

Figure 2:
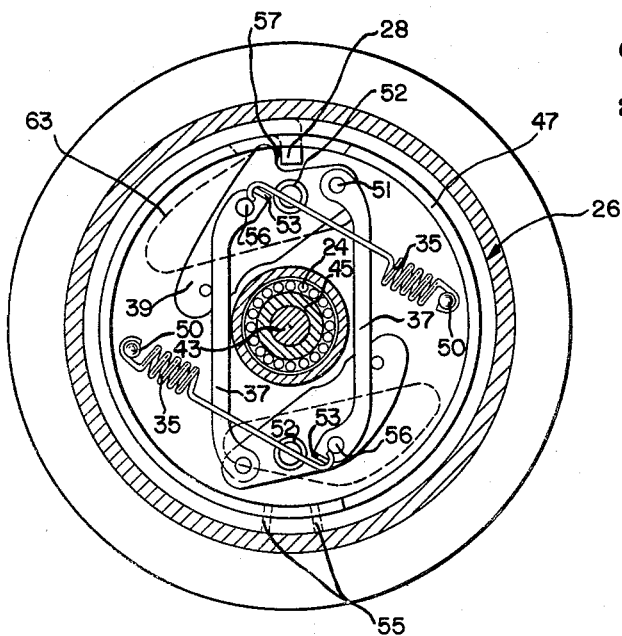
Figure 2 is a section taken at 2—2 of Figure 1.

Looking at Figure 2, it will be seen that the governor assembly is designed to disengage the clutch 26 from pulley 21. Centrifugal weights 39 are pivoted about pivots 52 which are fixed to the hub 27. Synchronizing rods 37 are pivoted to the weights 39 by means of pins 51 and 56. Springs 35 are connected to the hub 27 by posts 50 and at their other ends are hooked about lips 53 on rods 37.

The operation of this embodiment is as follows: During the lower engine speed ranges the weights 39 are in their retracted positions, as shown by solid lines in Figure 2. Spring clutch 26 engages pulley 21. Shaft 23 and hub 27 turn in a clockwise direction thereby causing spring clutch 26 to drive pulley 21 also in a clockwise direction.

Figure 3:
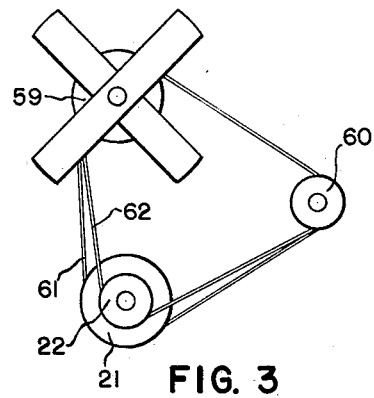
Figure 3 is a diagrammatic view of a fan and generator drive incorporating this invention.

Referring to Figure 3, it will be seen that a fan driving pulley 59 is rotatably mounted adjacent to the engine crankshaft as is likewise a generator drive pulley 60. Both pulleys 59 and 60 are provided with double belt grooves to receive conventional V belts. A belt 61 extends around pulleys 21, 59 and 60 and a belt 62 extends around pulley 22, 59 and 60. When the clutch 26 is driving the pulley 21 the fan and generator will be driven at a high speed ratio and these pulleys will in turn drive the pulley 22 faster than engine speed. Roller clutch 42 permits pulley 22 to rotate at a rate faster than shaft 45.

As the crankshaft speed increases, the centrifugal weight 39 will be thrown outwardly against the force of springs 35. When this occurs, an ear 57 on weight 39 contacts lip 28 on the free end of spring 26 to disengage it from the pulley 21. The pulley 21 now begins to slow down and this slows down the speed of pulley 22. When the speed of pulley 22 gets down to crankshaft speed, roller clutch 42 will pick up the drive to rotate this pulley as a unit with the crankshaft. Now the accessories will be driven by the smaller diameter pulley 22 and therefore will be driven at a proportionately lower speed ratio. The springs 35 and weights 39 are proportioned so that the clutch 26 is disengaged at about 1500 engine r.p.m.

Springs 35 exert a force on pivots 56 tending to rotate them about pivots 52 and to keep weights 39 in an inward position. When weights 39 are thrown to an outward position, as shown by dotted lines 63, the perpendicular distance or moment arm between pivot 52 and the counterrotative force through pivot 56 is shortened. With this arrangement, the speed at which the weights move outwardly will be considerably greater than that with which they move inwardly thereby tending to prevent the weights from hovering between the inward and outward positions.

I claim as my invention:

1. In an internal combustion engine, a driving member, a first pulley freely mounted for rotation upon said driving member, a second pulley having a diameter substantially less than said first pulley freely mounted for rotation upon said driving member, a coil spring clutch attached to said driving member and positioned between said driving member and said first pulley for engaging the driving member with said first pulley, a centrifugal weight mechanism pivotally mounted upon said driving member and contacting the coil spring clutch for actuating said coil spring clutch when the speed of said driving member reaches a predetermined value thereby disengaging said driving member from said first pulley, an overrunning clutch positioned between said driving member and said second pulley which engages when the speed of said driving member is equal to or exceeds the speed of said second pulley, an accessory having a pair of pulleys of substantially equal diameter, first means connecting one of the pulleys of said pair of pulleys to said first pulley mounted on said driving member, second means connecting the other of the pulleys of said pair of pulleys to said second pulley mounted upon said driving member whereby said accessory is driven by said first pulley mounted upon the driving member when said driving member is rotating at slow speeds and said coil spring clutch engages said driving member with said first pulley, but is driven by said second pulley mounted upon said driving member when said first pulley becomes disengaged from said driving member and said overrunning clutch engages said second pulley with said driving member.

2. In an internal combustion engine, a driving member, a clutch supporting ring having a slot positioned therein affixed to said driving member, a first pulley freely mounted for rotation upon said driving member, a second pulley having a diameter substantially less than said first pulley freely mounted for rotation upon said driving member, said first pulley having an inner face of larger internal diameter than the external diameter of said clutch supporting ring and positioned over said clutch supporting ring, a coil spring clutch positioned between the clutch supporting ring and the inner face of said first pulley, one end of said coil spring clutch being attached to said clutch supporting ring, the other end of said coil spring clutch having a depending lip positioned in the slot in said clutch supporting ring, said spring clutch being under tension so that said depending lip abuts said clutch supporting ring at one end of said slot and having an outer diameter in this position equal to or greater than the internal diameter of said first pulley whereby said driving member will drive said first pulley through said coil spring clutch, a spring biased centrifugal weight mechanism pivotally mounted upon said driving member and having a portion thereof positioned against the depending lip of said spring clutch for moving said depending lip along said slot, lengthening said spring thereby decreasing its outer diameter sufficiently to disengage said spring clutch when said driving member reaches a predetermined speed, an overrunning clutch positioned between said driving member and said second pulley adapted to engage when the speed of said driving member equals or exceeds the speed of said second pulley, an accessory having a pair of pulleys of substantially equal diameter, said pair of pulleys being connected to said first and said second pulleys mounted on said driving member by a pair of belts whereby said accessory is driven through one of said belts by said first pulley when said driving member is rotating at slow speeds and said first pulley is engaged with said driving member through said spring clutch, but being driven by said second pulley at higher speeds of said driving member when said coil spring clutch becomes disengaged from said first pulley, and said overrunning clutch engages said second pulley with said driving member.

3. The combination of claim 2 in which said spring biased centrifugal weight mechanism comprises a spring attached to said driving member at one end thereof and to a centrifugal weight at the other end for supplying a rotational moment to said weight for rotating the center of gravity of said centrifugal weight toward the axis of said driving member, the moment arm of said spring having a maximum value when said driving member is stationary and said centrifugal weight is at the limit of its inward rotation, but decreasing in value as said centrifugal weight is moved outwardly as said driving member increases in speed.

4. In an internal combustion engine, a driving member, a first pulley freely mounted for rotation upon said driving member, a second pulley having a diameter substantially less than said first pulley freely mounted for rotation upon said driving member, a coil spring clutch attached to said driving member and positioned between said driving member and said first pulley for engaging the driving member with said first pulley, a centrifugal weight mechanism comprising a weight pivotally mounted upon said driving member, a spring attached to said driving member at one end and to said weight at the other end for supplying a counterrotational moment to said weight acting in a direction opposite to the moment of the centrifugal force, the moment arm of said spring having a maximum length when said driving member is stationary and said centrifugal weight is at the limit of its inward travel, but decreasing in value as said weight is moved outwardly due to increasing driving member speed to a minimum value when said weight has reached the outward limit of its travel, said centrifugal weight contacting the coil spring clutch for actuating said coil spring clutch when the speed of said driving member reaches a predetermined value thereby disengaging said driving member from said first pulley, an overrunning clutch positioned between said driving member and said second pulley which engages when the speed of said driving member is equal to or exceeds the speed of said second pulley, an accessory having a pair of pulleys of substantially equal diameter, first means connecting one of the pulleys of said pair of pulleys to said first pulley mounted on said driving member, second means connecting the other of the pulleys of said pair of pulleys to said second pulley mounted upon said driving member whereby said accessory is driven by said first pulley mounted upon the driving member when said driving member is rotating at slow speeds and said spring coil clutch engages said driving member with said first pulley, but is driven by said second pulley mounted upon said driving member when said first pulley becomes disengaged from said driving member and said overrunning clutch engages said second pulley with said driving member.

5. In an internal combustion engine, a driving member, a first pulley rotatably mounted upon said driving member, a second pulley having a diameter less than said first pulley rotatably mounted upon said driving member, a coil spring clutch attached to said driving member and positioned between said driving member and said first pulley for engaging the driving member with said first pulley, a centrifugal weight mechanism pivotally mounted upon said driving member and contacting the coil spring clutch for actuating said coil spring clutch when the speed of said driving member reaches a predetermined value thereby disengaging said driving member from said first pulley, an overrunning clutch positioned between said driving member and said second pulley which engages when the speed of said driving member is equal to or exceeds the speed of said second pulley, an accessory having a pair of pulleys, first means connecting one of the pulleys of said pair of pulleys to said first pulley mounted on said driving member, second means connecting the other of the pulleys of said pair of pulleys to said second pulley mounted upon said driving member, whereby said accessory is driven by said first pulley mounted upon the driving member when said driving member is rotating at slow speeds and said coil spring clutch engages said driving member with said first pulley and is driven by said second pulley mounted upon said driving member when said first pulley becomes disengaged from said driving member and said overrunning clutch engages said second pulley with said driving member.

6. In a two speed accessory drive, a driving member, a first pulley rotatably mounted upon said driving member, a second pulley having a diameter less than said first pulley rotatably mounted upon said driving member, means for selectively coupling said pulleys to said driving member, said means comprising a coil spring clutch for coupling one of said pulleys to said driving member, a centrifugal weight mechanism pivotally mounted upon said driving member and contacting said coil spring clutch for disengaging said driving member from said one of said pulleys when the speed of said driving member reaches a selected value, an overrunning clutch for engaging the driving member with the other pulley when the speed of said driving member is equal to or exceeds the speed of said other pulley, a double accessory driving pulley, a first belt connecting said double pulley to the first pulley rotatably mounted upon said driving member, a second belt connecting said double pulley with the second pulley rotatably mounted upon said driving member whereby said double accessory driving pulley is driven by the pulley coupled to said driving member by said coil spring clutch when said driving member is rotating at slow speeds, and is driven by the pulley coupled to said driving member by said overrunning clutch when the pulley coupled to said driving member by said coil spring clutch becomes disengaged from said driving member.

7. In a two speed accessory drive, a driving member, a first pulley rotatably mounted upon said driving member, a second pulley having a diameter less than said first pulley rotatably mounted upon said driving member, means for selectively coupling said pulleys to said driving member, said means comprising a coil spring clutch for coupling one of said pulleys to said driving member, a centrifugal weight mechanism pivotally mounted upon said driving member and contacting said coil spring clutch for disengaging said driving member from said one of said pulleys when the speed of said driving member reaches a selected value, an overrunning clutch for engaging the driving member with the other pulley when the speed of said driving member is equal to or exceeds the speed of said other pulley, a first double accessory driving pulley rotatably mounted in position radially spaced from said driving member, a second double accessory driving pulley mounted in position radially spaced from said driving member and from said first double pulley, a first belt extending around said first pulley rotatably mounted upon said driving member and said first double pulley and said second double pulley, and a second belt extending around said second pulley rotatably mounted upon said driving member and said first double pulley and said second double pulley.

8. In a two speed accessory drive, a driving member, a first pulley rotatably mounted upon said driving member, a second pulley having a diameter less than said first pulley rotatably mounted upon said driving member, means for selectively coupling said pulleys to said driving member, said means comprising a first clutch for coupling one of said pulleys to said driving member and a second clutch for coupling the other of said pulleys to said driving member, said second clutch being an overrunning clutch, a first double accessory driving pulley rotatably mounted in position radially spaced from said driving member, a second double accessory driving pulley mounted in position radially spaced from said driving member and from said first double pulley, a first belt extending around the first pulley rotatably mounted upon said driving member and said first double pulley and said second double pulley, and a second belt extending around said second pulley rotatably mounted upon said driving member and said first double pulley and said second double pulley.

9. In a two speed accessory drive, a driving member, a first pulley rotatably mounted upon said driving member, a second pulley having a diameter less than said first pulley rotatably mounted upon said driving member, means for selectively coupling said pulleys to said driving member, said means comprising a coil spring clutch for coupling one of said pulleys to said driving member and an overrunning clutch for coupling the other of said pulleys to said driving member, a first double accessory driving pulley rotatably mounted in position radially spaced from said driving member, a second double accessory driving pulley mounted in position radially spaced from said driving member and from said first double pulley, a first belt extending around the first pulley rotatably mounted upon said driving member and said first double pulley and said second double pulley, and a second belt extending around said second pulley rotatably mounted upon said driving member and said first double pulley and said second double pulley.

10. In an engine accessory drive having a driving member, a pulley rotatably mounted upon said driving member, a clutch mechanism for operatively coupling said pulley to said driving member, the improvement comprising a centrifugal weight mechanism for controlling the engagement of said clutch, said centrifugal weight mechanism comprising a centrifugal weight pivotally mounted upon said driving member, a spring attached to said driving member at one end and operatively coupled to said centrifugal weight mechanism at the other end, the line of action of said spring being positioned inboard of the pivotal connection of said centrifugal weight to said driving member, with the position of the coupling of said spring to said centrifugal weight being on that portion of the centrifugal weight that moves outwardly as the speed of said driving member is increased, whereby the moment arm of said spring has a maximum value when said centrifugal weight is at the limit of its inward travel and has a minimum value when said centrifugal weight is at the limit of its outward travel.

11. In an engine accessory drive, an engine, a first speed driving member rotatably mounted in axial alignment with a driven shaft of said engine, a second speed driving member rotatably mounted in axial alignment with said driven shaft, a friction clutch arranged to operatively couple said first speed driving member with said driving shaft, an overrunning clutch coupling said second speed driving member with said shaft, a pair of governor weights arranged to move radially by centrifugal force, said weights being rotated by said shaft and positioned at diametrically opposed points around the axis of said shaft, means for connecting said weights so that radial movement of one of said weights thru a given increment will move the other of said weights thru the same increment of movement and which will insure that the unbalance produced by one of said weights in each of its radial positions will be counteracted by the unbalance produced in the other of said weights in each of its corresponding radial positions and means connecting said weights to said friction clutch so that engagement and release of said friction clutch will be controlled by the radial position of said weights.

12. In an engine accessory drive, an engine, a first speed driving pulley rotatably mounted in axial alignment with the crankshaft of said engine, a second speed driving pulley rotatably mounted in axial alignment with said crankshaft, a friction clutch arranged to operatively couple said first speed driving pulley with said shaft, an overrunning clutch coupling said second speed driving pulley with said shaft, a pair of governor weights arranged to move outwardly by centrifugal force to disengage said clutch when said weights are in their outermost positions, said weights being rotated by said crankshaft and positioned at diametrically opposed points around the axis of said shaft, and means for connecting said weights so that radial movement of one of said weights thru a given increment will move the other of said weights thru the same increment of movement so that the unbalance produced by one of said weights in each of its radial positions will be counteracted by the unbalance produced in the other of said weights in each of its corresponding radial positions.

13. In a two speed engine accessory drive, an engine, a first speed driving pulley rotatably mounted in axial alignment with the crankshaft of said engine, a second speed driving pulley rotatably mounted in axial alignment with said crankshaft, a friction clutch arranged to operatively couple said first speed driving pulley with said shaft, an overrunning clutch coupling said second speed driving pulley with said shaft, a pair of governor weights arranged to move outwardly by centrifugal force to disengage said clutch when said weights are in their outermost position, said weights being positioned at diametrically opposed points around the axis of said shaft and being mechanically connected together so that the unbalance produced by each of said weights in each of its radial positions is counterbalanced by the unbalance produced in the other of said weights in its corresponding radial position, an accessory driving double pulley radially spaced from the axis of said crankshaft, a belt extending around said first speed driving pulley and said double pulley, and a second belt extending around the second speed driving pulley and said double pulley, the diameters of said first speed driving pulley and said second speed driving pulley and said double pulley being such that when the first speed driving pulley is coupled to said crankshaft, said double pulley wil be driven at one speed ratio relative to said shaft and when said second speed driving pulley is coupled to said crankshaft, said double pulley will be driven thereby at a different speed ratio relative to said crankshaft.

14. In a two speed accessory drive, a driving member, a first pulley rotatably mounted upon said driving member, a second pulley rotatably mounted upon said driving member, means for selectively coupling said pulleys to said driving member, said means comprising a first clutch for coupling one of said pulleys to said driving member and a second clutch for coupling the other of said pulleys to said driving member, said first clutch and said second clutch including means for coupling said first pulley to said driving member and for decoupling said second pulley from said driving member when said driving member is rotating at a speed below a selected speed level and for decoupling said first pulley from said driving member and for coupling said second pulley to said driving member when said driving member is rotating at a speed above said selected speed level, an accessory driving double pulley mounted in position radially spaced from said driving member, a second accessory driving pulley mounted in position radially spaced from said driving member and from said double pulley, a belt extending around said first pulley and said accessory driving double pulley and said second accessory driving pulley, and a second belt extending around said second pulley and said accessory driving double pulley, the respective diameters of said first and second pulleys and said accessory driving double pulley being such that when said accessory driving double pulley is driven by said first pulley it rotates at a different speed ratio relative to said driving member than when it is rotated by said second pulley.

15. A two speed accessory drive comprising a driving member, a first pulley rotatably mounted upon said driving member, a second pulley mounted upon said driving member and means for selectively coupling said first and second pulleys to said driving member, said means comprising a substantially self-energizing coil spring clutch which is biased to normally engage one of said pulleys with the driving member and which further comprises a release mechanism for said self-energizing coil spring clutch, said release mechanism comprising a control member urged in one direction by centrifugal force and in the other direction by spring bias and being supported in such a way that the spring bias becomes less effective as centrifugal force moves the control member against the spring bias, said control member being provided with means for releasing the self-energizing coil spring clutch whenever the speed of the driving member exceeds a predetermined maximum and for permitting reengagement of the self energizing coil spring clutch whenever the speed of the driving member decreases a significant amount below the said predetermined maximum.

References Cited in the file of this patent
UNITED STATES PATENTS

| | | |
|---|---|---|
| 750,498 | Sperry | Jan. 26, 1904 |
| 756,363 | Helfers | Apr. 5, 1904 |
| 1,983,827 | Winther et al. | Dec. 11, 1934 |
| 2,186,290 | Gordon et al. | Jan. 9, 1940 |
| 2,463,100 | Gredell | Mar. 1, 1949 |
| 2,641,137 | Orcutt et al. | June 9, 1953 |
| 2,643,750 | Moulton | June 30, 1953 |
| 2,694,175 | Davis | Nov. 9, 1954 |
| 2,694,937 | Birbaum | Nov. 23, 1954 |
| 2,762,229 | Coning et al. | Sept. 11, 1956 |
| 2,851,865 | Jacobs | Sept. 16, 1958 |